(No Model.) 2 Sheets—Sheet 2.
C. McCABE.
AUTOMATIC FISHING DEVICE.
No. 371,777. Patented Oct. 18, 1887.
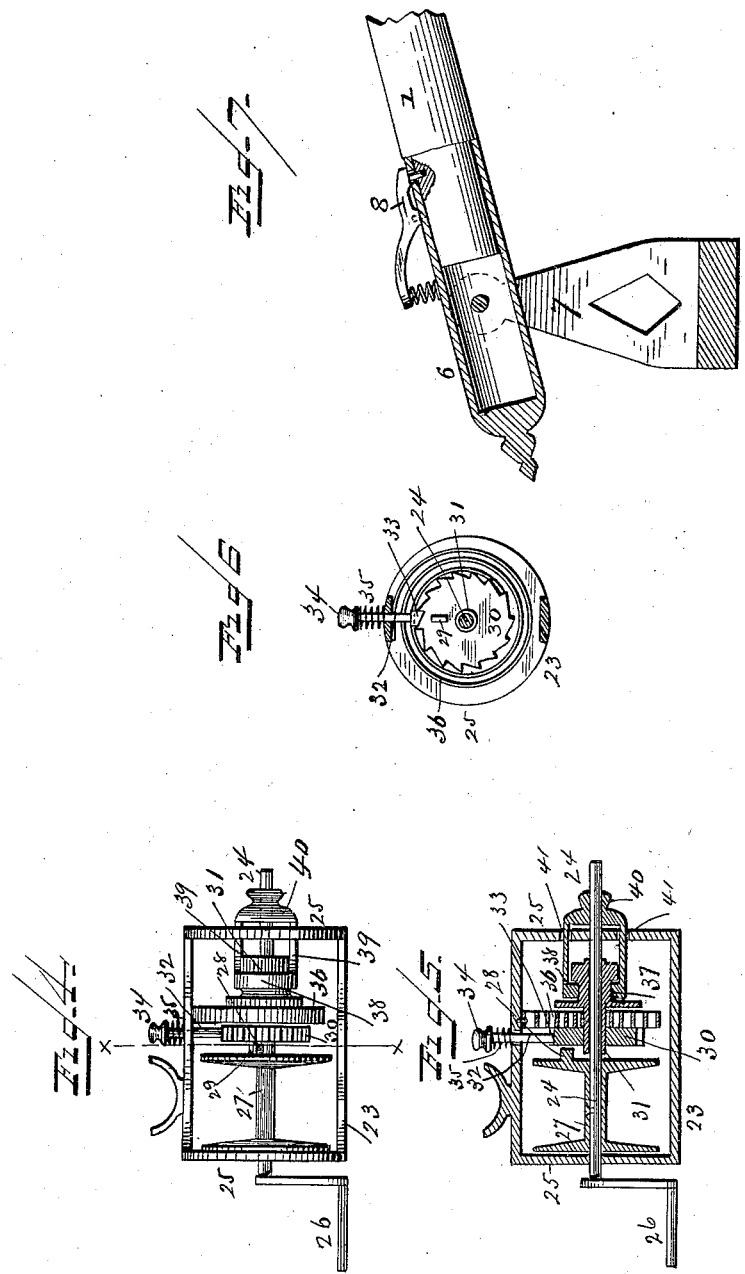
Witnesses
F. L. Durand
Benj. J. Cowl
Inventor
Charles McCabe,
By his Attorneys
Louis Bagger & Co.

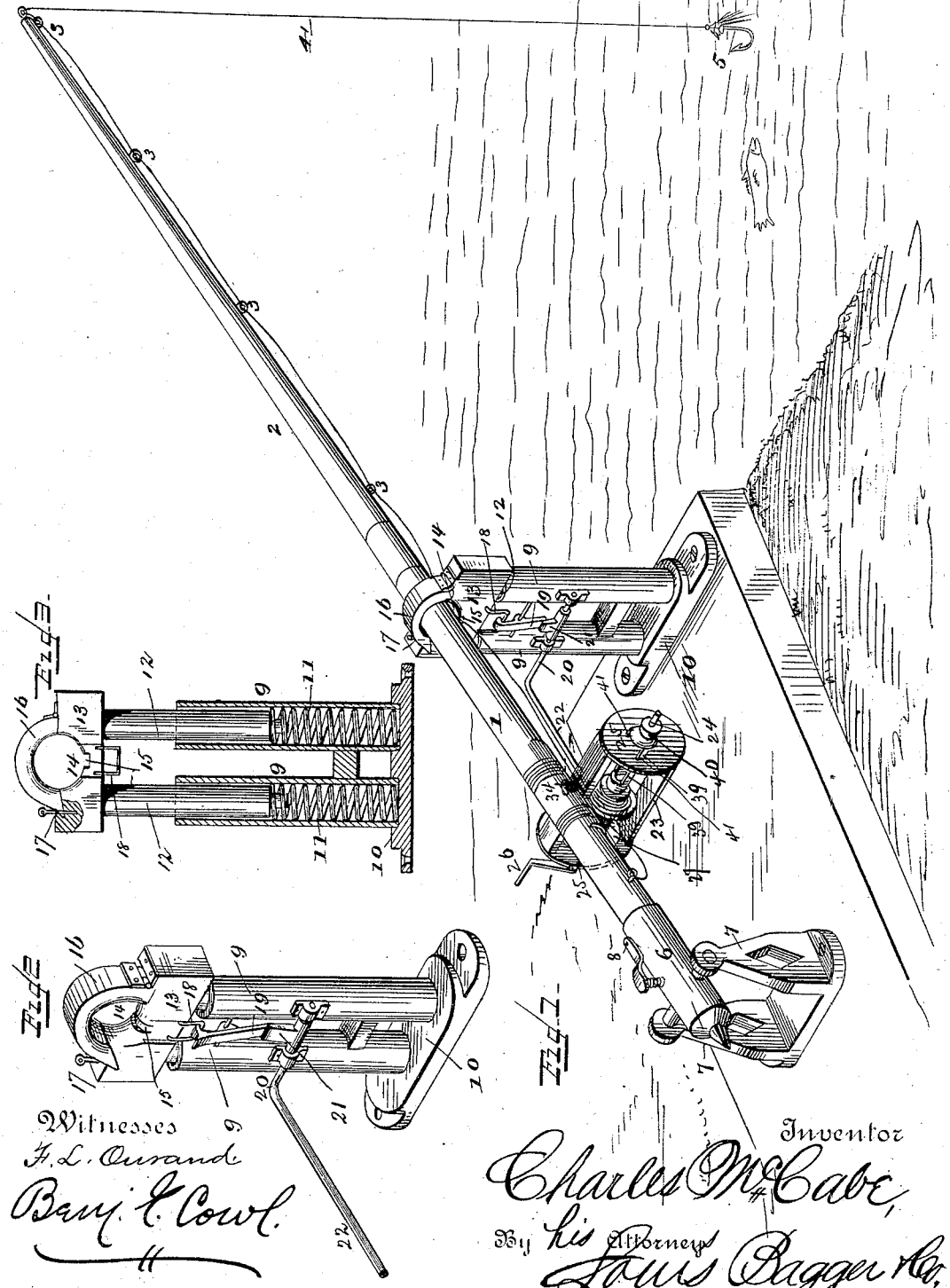

UNITED STATES PATENT OFFICE.

CHARLES McCABE, OF CUMBERLAND, MARYLAND.

AUTOMATIC FISHING DEVICE.

SPECIFICATION forming part of Letters Patent No. 371,777, dated October 18, 1887.

Application filed July 5, 1887. Serial No. 243,380. (No model.)

*To all whom it may concern:*

Be it known that I, CHARLES McCABE, a citizen of the United States, and a resident of Cumberland, in the county of Alleghany and State of Maryland, have invented certain new and useful Improvements in Automatic Fishing Devices; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved automatic fishing device, showing it in operative position. Fig. 2 is a similar view of the forward support for the rod. Fig. 3 is a vertical sectional view of the same. Fig. 4 is a view of the reel. Fig. 5 is an axial sectional view of the same. Fig. 6 is a transverse sectional view on line $x\,x$, Fig. 5; and Fig. 7 is a longitudinal vertical sectional view of the rear support.

Similar numerals of reference indicate corresponding parts in all the figures.

My invention has relation to devices for automatically hooking and playing fish; and it consists in the improved construction and combination of parts of such a device in which a fishing-pole is supported by a forward spring-support, which may be released to yield vertically by the revolution of the crank of the reel, and in which the pole is provided with a reel having a spring, which will be wound by the fish drawing the line out, so that the spring will again pull the line in, and thus play the fish until the person in charge of the device can pull the fish in, as hereinafter more fully described and claimed.

In the accompanying drawings, the numeral 1 indicates the inner joint of the rod, which may be composed of any number of additional joints, or may be made in one piece, as it may be desired, and this rod 2 is provided with suitable guide-eyes, 3, through which the line 4 passes, the said line having the hook 5 at its end.

The inner end of the rod is secured in a socket, 6, pivoted between two uprights, 7, secured upon whatever foundation the device may have, and the socket is formed with a spring-catch, 8, engaging the end of the rod and holding it in the socket.

The forward support for the rod is formed by two tubular uprights, 9, secured upon a base-plate, 10, which is secured to the foundation upon which the device is placed, and two coiled springs, 11, are placed within these uprights, and bear with their upper ends against the lower shouldered ends of two rods, 12, united at their upper ends by a yoke, 13. This yoke is formed with a semicircular notch or recess, 14, having a smaller notch, 15, in its bottom, and the rod may rest in this recess with the line passing through in the notch, and the rod is retained in the recess by means of a hinged cap, 16, having a similar semicircular recess and hinged at one end to one end of the yoke, and provided with a latch, 17, at its other end for securing it, the semicircular recesses forming a perfectly-fitting rest for the rod. A small loop or bail, 18, projects downward from the middle of the yoke at the forward side of the same, and the upper hooked end of a lever, 19, pivoted between the uprights, may engage this bail when the yoke and rods are pressed down, holding the yoke and rods down against the pressure of the springs.

A shaft, 20, is journaled transversely upon the forward sides of the uprights, and has an arm, 21, which may bear against the lower end of the hooked lever, and the outer end of this shaft is provided with a long arm, 22, which will project rearward when the arm at the middle of the shaft bears against the lower end of the hooked lever, the arms projecting at right angles to each other from the shaft.

The reel is composed of the frame 23, which may be of any suitable construction and secured to the rod in any desired manner, and the shaft 24 so journaled in the heads 25 of the frame and is provided with a crank, 26, at one end. The drum 27 of the reel is secured upon the shaft, and has a laterally-projecting clutch-stud, 28, upon its inner end, which stud may engage a similar stud, 29, upon the face of a ratchet-wheel, 30, secured upon a sleeve, 31, journaled and sliding upon the shaft. The ratchet-wheel may be engaged by a pawl formed by a rod, 32, sliding in a suitable radiating bearing in the frame and having its inner end, 33, beveled, and having a knob or handle, 34, at its outer end and a coiled spring, 35, around it, serving to draw the rod out in the bearing and out of engagement with the ratchet-wheel. A coiled spring, 36, similar to a watch or clock spring, is secured with its inner end to the sleeve and with its outer end to the frame of the reel, and the outer end of the sleeve is provided with a circumferential groove, 37, in which a ring, 38, fits, admitting of the sleeve revolving within it, and arms 39 are secured with the inner ends to this ring, and have their outer ends secured to a knob, 40, sliding upon the shaft of the reel outside of the head of the reel, the arms sliding in bearings 41 in the head parallel to the shaft.

When the device is to be used, the rod is placed in the rear support, and is placed within the box of the forward support, whereupon the rods of the forward support are depressed into the uprights, compressing the springs until the hooked short arm of the lever may engage the bail or loop when the rods and bearing or box will be held down. The shaft is thereupon revolved so as to bring the upwardly-projecting short arm to bear lightly against the long lower arm of the hooked lever, thus bringing the long arm at the end of the shaft to project rearward and within reach of the crank upon the reel. The sleeve upon the reel-shaft is now pushed in, so as to bring the clutch studs or lugs into engagement, when the spring may be partly wound by revolving the shaft by means of the crank, and when the spring has been sufficiently wound the sliding pawl is forced down against its spring, and will be held down by the pressure of the clock-spring tending to revolve the ratchet-wheel, and thus causing the teeth of the ratchet-wheel to bear against the lower end of the rod, the rod at the same time stopping the ratchet-wheel and sleeve from revolving. The reel-shaft is now revolved so as to bring the clutch-lugs out of contact with each other, and so as to allow the reel-shaft to make a considerable portion of a revolution before the lugs come again in contact, and the device is ready for use.

When a fish bites, it will pull upon the line and revolve the reel drum and shaft sufficiently to bring the crank to strike the arm of the trigger-shaft upon the forward support, which will force the upwardly-projecting arm against the long arm of the hooked lever, tilting the same and releasing the bail of the yoke, which will be forced up by the power of the compressed springs in the uprights. This quick upward jerk which the rod will thus receive will hook the fish, and the fish will now draw out upon the line, which will, by revolving the drum of the reel, wind the spring, so that as soon as the fish again slackens the line the spring will wind the slack up, the device thus playing with the fish and keeping it on the hook until the person in charge of the device can arrive and pull in the fish and release it from the hook. The yielding forward support and the spring in the reel will both serve to keep the line taut without any danger of jerking the hook out of the mouth of the fish, and the entire device will hook the fish and play it in the same manner in which an experienced fisherman will play the fish before pulling it in.

By using this device one person may have a number of rods and lines, which all will take care of themselves, the only care which they require being to pull in the fish and to bait the hooks and set the device, and the device may either be secured to the gunwale of a boat or it may be placed upon the bank of the water, having a suitable support, which may either form a portion of the device, or it may be simply the ground, a tree, or piece of lumber, or any other object to which the supports may be secured.

The entire device may be secured in knock-down fashion to the bottom or sides of a box or case, within which the rod and other fishing utensils or similar arrticles may be carried, so that the device will at all times have a suitable support and at the same time a receptacle in which it may be transported in good condition.

Having thus described my invention, I claim and desire to secure by Letters Patent of the United States—

1. A device for catching fish, consisting in a pole having a pivoted rear support for its inner end and a yielding forward support provided with means for setting and releasing it, and a reel having a spring winding upon it, as and for the purpose shown and set forth.

2. In an automatic fishing device, a reel having the line winding upon it and having a flat-coiled spring secured to its axle and wound upon it in the opposite direction to the line, as and for the purpose shown and set forth.

3. In an automatic fishing device, the combination, with a rod having a reel provided with a spring for winding the line upon it, of a pivoted rear support for the inner end and a forward support having a rest supported by springs, and having a catch for holding down the rest and for releasing it by the revolution of the crank of the reel, as and for the purpose shown and set forth.

4. In an automatic fishing device, the combination of a rod, a pivoted rear support for the inner end of the rod, and a forward support consisting of a rest for the rod having two rods sliding within tubes and supported upon springs, and provided with a bail or loop engaged by a hooked lever having an arm upon a rock-shaft in contact with it, the said rock-shaft having an arm projecting out within reach of the crank of the reel upon the rod, as and for the purpose shown and set forth.

5. In an automatic fishing device, the combination of a rod, a pivoted rear support for the inner end of the rod, two vertical tubes having coiled springs within them, a closed rest for the rod having two rods sliding against the springs in the tubes and having a downwardly-projecting loop or bail, a lever pivoted between the tubes and having its short hooked arm engaging the bail, and a rock-shaft upon the tubes having an arm bearing against the lower long arm of the hooked lever, and having a rearwardly-projecting arm extending within reach of the crank of the reel upon the rod, as and for the purpose shown and set forth.

6. In an automatic fishing device, the combination of a rod having a reel provided with a spring winding the line upon the reel, a socket for the inner end of the rod, having a spring-catch for engaging the said end and pivoted upon trunnions between suitable uprights, tubular uprights having spiral springs within them, a rest or bearing for the rod having two rods sliding in the uprights and bearing against the springs and provided with a downwardly-projecting bail or loop, a lever pivoted between the uprights and having its upper hooked short arm engaging the loop or bail, and a rock-shaft journaled upon the uprights and provided with a short arm bearing against the long lower arm of the lever and with a long arm extending rearward within reach of the crank of the reel, as and for the purpose shown and set forth.

7. In an automatic fishing device, the combination of a reel-frame having bearings in one head parallel to the axle-bearing, a shaft journaled in the bearings in the heads and having a crank at one end and provided with a drum having a laterally-projecting clutch-lug upon one head, a sleeve having a ratchet-wheel at one end provided with a clutch-lug upon its face engaging the lug upon the drum and having a coiled spring secured to it and winding upon it and provided with a circumferential groove near the outer end, a rod sliding radially in the reel-frame and having a knob at its outer end and a beveled inner end engaging the ratchet-wheel and provided with a spring forcing it outward, and a knob sliding upon the end of the shaft outside of the head and having two rods sliding in the bearings parallel to the shaft, and having a ring at the inner ends fitting in the groove of the sleeve, and a pole and line, as and for the purpose shown and set forth.

8. In an automatic device for fishing, the combination of a rod, a socket for the rear end of the rod pivoted between suitable supports, upright tubes having coiled springs within them, a closed rest or box for the rod, having rods sliding in the uprights bearing against the springs and having a downwardly-projecting loop or bail, a hooked lever engaging the said loop with its upper hooked end, a rock-shaft having an arm bearing against the lower end of the hooked lever and having a rearwardly-extending arm, a reel-frame upon the rod, a shaft journaled in the heads of the frame and having a crank at one end capable of engaging the arm of the rock-shaft, and having a drum upon it provided with a clutch-lug upon one head, a sleeve sliding upon the shaft and having a circumferential groove in one end, a ratchet-wheel upon the inner end of the sleeve, having a clutch-lug upon its face engaging the lug upon the drum, a rod sliding radially in a bearing in the frame and having a knob at its outer end, and having its inner beveled end engaging the ratchet-wheel and provided with a spring forcing it outward, a clock-spring secured to the sleeve and to the frame, and a knob sliding upon the shaft outside of the head of the frame and provided with two arms sliding in bearings in the head parallel to the shaft and having a ring at the inner ends fitting in the groove of the sleeve, as and for the purpose shown and set forth.

In testimony that I claim the foregoing as my own I have hereunto affixed my signature in presence of two witnesses.

CHARLES McCABE.

Witnesses:
 HENRY HANEKAMP,
 WM. HILDERBRANDT.